(12) United States Patent
Dantec et al.

(10) Patent No.: US 8,930,488 B2
(45) Date of Patent: Jan. 6, 2015

(54) METHOD AND SYSTEM FOR THE MULTI-CRITERIA MANAGEMENT OF PRESENCE NOTIFICATIONS

(75) Inventors: Fabrice Dantec, Saint Renan (FR); Frederic Priam, Brest (FR); Patrick Mescam, Brest (FR); Jerome Elleouet, Brest (FR)

(73) Assignee: Alcatel Lucent, Boulogne-Billancourt (FR)

( * ) Notice: Subject to any disclaimer, the term of this patent is extended or adjusted under 35 U.S.C. 154(b) by 79 days.

(21) Appl. No.: 13/254,387

(22) PCT Filed: Feb. 11, 2010

(86) PCT No.: PCT/FR2010/050228
§ 371 (c)(1),
(2), (4) Date: Nov. 15, 2011

(87) PCT Pub. No.: WO2010/100354
PCT Pub. Date: Sep. 10, 2010

(65) Prior Publication Data
US 2012/0054279 A1    Mar. 1, 2012

(30) Foreign Application Priority Data
Mar. 3, 2009 (FR) .................................... 09 00962

(51) Int. Cl.
G06F 15/16    (2006.01)
H04L 29/08    (2006.01)
H04L 12/58    (2006.01)

(52) U.S. Cl.
CPC ............ *H04L 67/24* (2013.01); *H04L 12/5815* (2013.01); *H04L 12/585* (2013.01); *H04L 51/043* (2013.01); *H04L 51/12* (2013.01)

USPC .......................................... 709/217; 709/224

(58) Field of Classification Search
CPC .... H04L 12/5815; H04L 51/043; H04L 67/24
USPC ........................................ 709/204, 224, 217
See application file for complete search history.

(56) References Cited

U.S. PATENT DOCUMENTS

| | | | |
|---|---|---|---|
| 7,787,609 B1* | 8/2010 | Flockhart et al. ......... | 379/265.01 |
| 7,999,728 B2* | 8/2011 | Chen et al. ............... | 342/357.25 |
| 8,239,464 B2* | 8/2012 | Colon ........................... | 709/206 |
| 8,291,067 B2* | 10/2012 | Veeramachaneni et al. .. | 709/224 |
| 8,301,169 B2* | 10/2012 | Hung et al. ................ | 455/456.3 |
| 8,473,733 B2* | 6/2013 | McColgan et al. ........... | 713/151 |

(Continued)

FOREIGN PATENT DOCUMENTS

| | | |
|---|---|---|
| WO | WO 03/003694 A2 | 1/2003 |
| WO | WO 2008/041830 A1 | 4/2008 |

OTHER PUBLICATIONS

International Search Report for PCT/FR2010/050228 dated May 26, 2010.

*Primary Examiner* — Kristie Shingles
(74) *Attorney, Agent, or Firm* — Fay Sharpe LLP

(57) ABSTRACT

Multicriteria management method for presence notifications proposed by a means of instant communications comprising a list of contacts that is not empty and connected to a presence server, such method comprising the following steps:
 configuration of rules to filter the presence notifications to be displayed and transmitted from the presence server;
 automatic configuration of presence information;
 automatic broadcasting of presence information on social networking and microblogging tools.

9 Claims, 2 Drawing Sheets

(56) References Cited

U.S. PATENT DOCUMENTS

Figure 1:
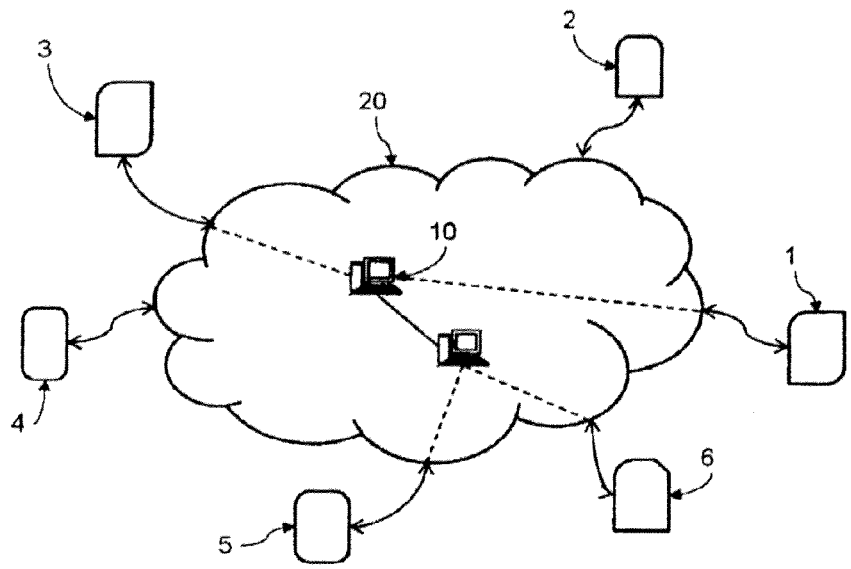

| | | |
|---|---|---|
| 2008/0010301 A1 | 1/2008 | Tian et al. |
| 2008/0114776 A1* | 5/2008 | Sun et al. ........................ 707/10 |
| 2008/0240384 A1 | 10/2008 | Suryanarayana et al. |
| 2009/0019467 A1* | 1/2009 | Kim ................................ 725/14 |
| 2009/0276500 A1* | 11/2009 | Karmarkar .................... 709/206 |
| 2010/0153521 A1* | 6/2010 | Lor et al. ....................... 709/219 |
| 2011/0138279 A1* | 6/2011 | Vuong .......................... 715/711 |

* cited by examiner

METHOD AND SYSTEM FOR THE MULTI-CRITERIA MANAGEMENT OF PRESENCE NOTIFICATIONS

The present invention pertains to the technical field of telecommunications, and more particularly, to presence notifications intended for users of means of instant communications.

Internet development has brought about a great number of means of communication and collaboration which continue to develop: mailing lists, instant messaging, wikis, weblogs, e-mail, forums, etc.

In particular, instant messaging (IM) services have experienced explosive popularity. They have the particular feature that interactions between users are online and in real-time, thereby enabling an active dialogue, unlike other means of communication whose interactions are carried out off-line and with a delay. It should be noted that instant messaging services are sometimes designated by the terms chat and chatting.

Instant messaging is a computer system that enables the instant exchange of data (text, voice, visual, emoticons) between multiple remote terminals (computers. PDAs, and mobile telephones, for example) connected to the same network, most commonly the Internet.

As it has evolved, instant messaging has increasingly integrated features such as voice, video, and all sorts of collaborative applications (shared whiteboards, text editing, and gaming, for example.) To achieve this, instant messaging requires the use of a software application or web interface that connects to an instant messaging server. Instant messaging users therefore, in general, have an account associated with an instant messaging program or web interface such as Windows Live Messenger, Microsoft Office Communicator, or Yahoo! Messenger, ICQ™, My Teamwork (published by Alcatel-Lucent), and MSN Web messenger.

Most instant messaging services offer a system for announcing presence and availability notifications in real time, which indicates the members who are online to interact with, as well as their availabilities, and sometimes even their mood. The announced presence status may also be explained, in order to indicate, for example, the cause of an unavailability: "busy (writing the report)", "absence (out to eat)", "back in 10 minutes", "do not disturb", "on the phone", "in a meeting," "at the office".

By way of example, Windows Live Messenger offers a plurality of presence statuses symbolizing the availability of each of the contacts in a user's list. Each user may display his or her status, meaning his or her current activity: logged out, logged in, away, unavailable, invisible. Invisible status can be used to view the list of people logged in without becoming visible to one's contacts.

Presence management has proven particularly useful for users who can verify the status of their contacts before any attempt to contact them through instant messaging. In doing so, it makes it possible to simplify and encourage the establishment of communication.

By way of example, a user who has all members of his or her remote collaborative work team in his or her list, can tell the availability of his or her collaborators in real time and synchronize their interactions as a result.

Citable examples of presence management systems used by instant messaging services include DynamicSoft, Indigo Software, and Hotsip.

Other means of communication, offering the presence service, have been as successful as instant messaging services. This is particularly true of the latest generations of means of mobile communication and of social networking and microblogging tools (Twitter, Jaiku, Co-op, Yammer, and SocialCast).

Most social networking and microblogging tools enable a user to display indicators of his or her presence to his or her network. By way of example, a user can use short messages to inform his or her network of "what he/she is now doing." These messages are updated manually by the user, retrieved from an instant messaging service, or retrieved from other sources using an RSS feed.

Below, the term "instant means of communication" shall designate all means of real-time communication, such as instant messaging services, means of mobile communication, and social networking and microblogging tools.

Presence management is deployed throughout the means of instant communications in a transparent manner, so that the status is displayed to the list of contacts in response to each change. In other words, if a user's presence status changes, for example, from logged out to logged in, from busy to available, or from invisible to absent, a notification indicating the new status is distributed to all or to some (selective distribution) of the contacts in the list. Thus, a user:

will be the originator of as many presence notifications sent to his or her contacts as there have been changes to his or her presence status; and
 will be shown as many presence notifications as there have been presence status changes made to the presence statuses of his or her contacts.

Consequently, presence notification management relates to:

the user who originated the displayed notifications, hereafter designated the generator because by modifying his or her presence status, he or she generates a notification; and to
 the user who receives these notifications, hereafter designated the observer because he or she observes the received notifications.

In practice, presence management involves multiple problems, both for the generator and for the observer. This is because a user who has a plurality of contacts in his or her list may:

receive unclaimed notifications. In particular, an observer will receive a notification in response to any change in the presence statuses related to each contact in his or her list. This risks bothering the observer (very frequent notifications) and influencing the proper working order of the means of instant communications (computing resources) and the event underway a simulation, meeting, or spoken communication that is underway, for example.)
 be obligated to carefully review all received notifications or regularly consult the statuses of his or her contacts, in order to be informed of the current status of one or another particular contact;
 be constrained to frequently consult his or her active presence information, for example before every event (meeting, conference, being away from the application) or each time the means of instant communications start up;
 be constrained to manually update his or her presence information (his or her presence status and/or "what he/she is now doing") on the social networking and microblogging tools.

Furthermore, in general, a user's presence information in a social networking or microblogging tool are unchanged as long as the user does not edit them manually. Thus, a user registered for more than one means of instant communications is constrained to indicate his or her presence information as many times as there are means of communication for which he or she is registered.

The document WO 2008/041830 describes one method enabling an observer to define rules dealing with the manner (grouped notifications) and time of reception (when the number of them is at least/at most/exactly equal to a predetermined number) of the presence notifications related to a set of contacts in his or her list. The observer receives a constructed notification once the rule is satisfied.

The presence notification management solution recently introduced by Wind Mobile is devoted to mobile telephones. It enables the user of a mobile telephone to assign him/herself a presence status for some duration, and to net that period of time. A caller who unsuccessfully attempted to reach a called party with the status "busy" will receive a notification once the called party's status is changed to "available."

Microsoft Office Communicator 2007 allows an observer to label a contact from his or her list in order to be automatically informed of that person's availability.

The FriendFeed, aggregator, published by FriendFeed Inc, makes it possible to group together updates from several social network and microblogging tools (such as Twitter) and from several instant messaging services (such as Google Talk) for the purpose of separately displaying the most up-to-date presence information of users in Google Talk and Twitter, for example. However, this solution only relates to:
   Users already registered for the instant communication tools covered by FriendFeed;
   presence information manually edited by the users.

Thus, few methods and systems are known to ensure multicriteria management of the presence notifications supported by the means of instant communications. Furthermore, these systems are very specific. They mainly relate to:
   managing presence notifications intended for a single instant communication tool (the Wind Mobile solution, for example);
   very limited notification management (the solution proposed by WO 2008/041830, for example, which deals with the number of presence notfications);
   only the management of notifications on the observer's end (the solution proposed by WO 2008/041830, for example) or only the management of notifications on the generator's end (the Wind Mobile solution, for example);

Consequently, known systems and methods are imperfect, particularly due to the absence of any management that would enable service that:
   covers a large number, if not all means of instant communications incorporating the presence service (instant messaging services and mobile communications terminals, for example);
   is unified, by paying attention to the user, whether he or she is a generator or observer of presence notifications;
   gives multiple criteria for presence notifications,
   is automatic and customizable (programmable by the user);
   can be exported/imported from one of a user's accounts to another;
   automatically handles, in real time, modifications to a user's presence information in social networking or microblogging tools in accordance with any change to his or her presence information in the instant messaging services.

One object of the present invention is to remedy the aforementioned drawbacks. In particular, the invention aims to propose a method, system, and computer program product enabling unified, multi-criteria management of the presence notifications supported by the means of instant communications that propose the presence service.

To that end, according to a first aspect, the invention proposes a multicriteria method for managing presence notifications proposed by a means of instant communications comprising a non-empty list of contacts and connected to a presence server, which method comprises the following steps:
   configuration of rules to filter the presence notifications to be displayed and transmitted from the presence server;
   automatic configuration of presence information;
   automatic broadcasting of presence information on social networking and microblogging tools;

According to a second aspect, the invention proposes a multicriteria system for managing presence notifications proposed by a means of instant communications comprising a non-empty list of contacts and connected to a presence server, which system comprises the following means:
   means of configuring rules to filter the presence notifications to be displayed and transmitted from the presence server;
   means of automatically configuring presence information:
   means of automatically broadcasting the presence information on social networking and microblogging tools;

According to a third aspect, the invention pertains to a computer program product implemented on a memory medium, which may be implemented within a computer processing unit, and comprises instructions for implementing the method summarized above.

The invention enables multicriteria management of presence notifications to be sent or received by a means of instant communications incorporating the presence server, independently of the means of instant communications itself.

It particularly makes it possible to filter out the presence notifications to be broadcast or received with the help of rules defined by the user of the means of instant communications.

By way of nonlimiting examples, the rules may deal with: time, the new status, the change in status, the previous status, and the number of notifications coming from one or more contacts. These rules may concern one or more contacts simultaneously.

The invention is particularly applicable in the event that the user has a plurality of contacts in his or her contact list in a means of instant communications, and is heavily requested through it.

Figure 2:
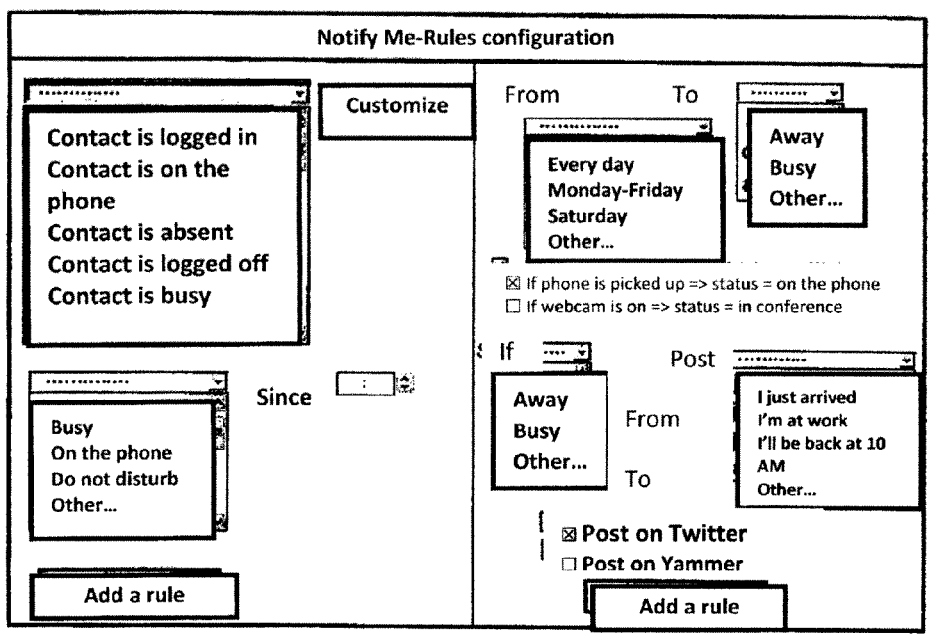
Figure 3:
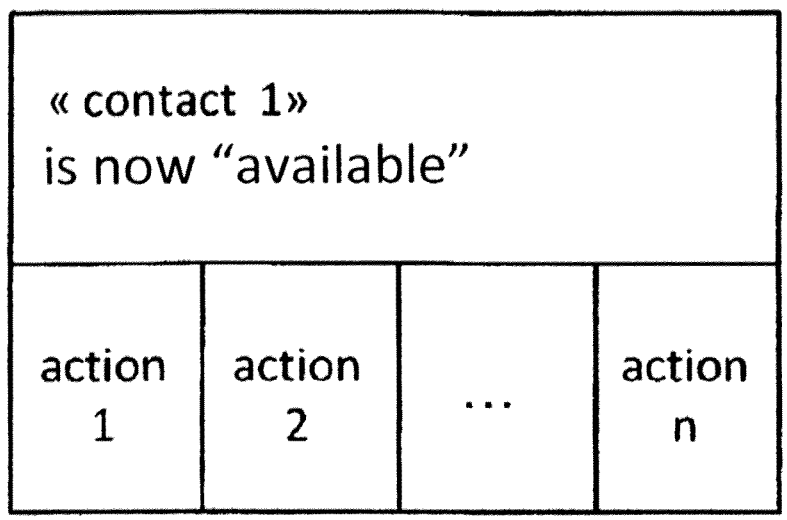

Other characteristics and advantages of the invention will become more clearly and completely apparent upon reading the description below of preferred embodiments, which is done with reference to the attached drawings in which:

FIG. 1 schematically depicts the application context of the invention,

FIGS. 2 and 3 schematically depict two variants of the inventive device.

In the present description of the method and system for multi-criteria management of presence notifications supported by the means of instant communications, the assumption is made that a user has an account in a means 1 of instant communications, and has a non-empty contact list.

With reference to FIG. 1, the user connects by means 1 of instant communications via a user interface associated with it. By way of non-limiting examples, this user interface is:
   a graphical user interface, commonly offered by means of instant messaging such as MSN Messenger, Yahoo! Messenger, and My Teamwork;

a web interface (web Messenger, social networking tools such as Twitter, Jaiku, Co-op, Yammer, and SocialCast, for example);

a user interface adapted to a mobile terminal (PDA (Personal Digital Assistant), mobile telephone).

FIG. 1 depicts different means 1-6 of instant communications, which may or may not be interoperable.

The means 1 of instant communications makes it possible to establish a communication between two users via a communications network 20. The communications network 20 may be a heterogeneous communications networking operating multiple interconnected communications networks such as the Internet and the public land mobile network (PLMN). Generally speaking, the connection to the means 1 of instant communications is preceded by a step of authentication, with the assistance of a user name and password, or more generally speaking, an identifier.

The presence information offered by the means 1 of instant communications is generally retrieved/transmitted from a presence server 10. The presence server 10 may be:

made up of a plurality of collaborative presence servers; and independent of or integrated into the platform of the means 1 of instant communications.

The present invention enables a user to define presence notification rules concerning one or more contacts. Whenever the rule is satisfied, a notification window appears to that user. The management of the notification's display is generally handled by the user interface of the means 1 of instant communications. It may take the form, for example:

of a small window displayed at the bottom right hand of the screen (in instant messaging, for example);

of a text-based message displayed in an inbox (in a mobile terminal, for example);

of a voice-based message speaking the textual content of a notification.

In order to enable a user to define a rule for filtering presence notifications, at least the means 1 of instant communication is associated with a graphical interface for configuring rules, as shown in FIG. 2. This interface displays default rules, such as the contact is no "logged in";

the contact is now "busy";

the contact's status had been "available" and now it is "in a call";

the contact is no longer "in a meeting";

the contact is now "do not disturb";

the contact Is no longer "on the phone";

the contact has been "busy" for n hours;

the contact has been "on the phone" for n minutes.

In other words, the rules to be configured comprise rules that deal with:

the contact's current status;

the change in the contact's status from one status to another;

the contact's previous status;

the current status paired with the time.

It is clear that some rules assume that the contact(s) in question are already connected.

According to another rule configuration mode, it is also possible to pair the rule with a certain frequency of displaying presence notifications. By way of examples, one may:

display a single constructed notification once there are certain number of presence notifications;

display a single notification, either simple or constructive, for each unit of time (per hour or per day, for example);

not display any more than n notifications per unit of time.

The use may also associate a rule with a plurality of contacts, such as:

all statuses of contacts are "available";

at least n statuses of N contacts are "available", where n is a whole number less than or equal to N to be specified by the user;

all of the contacts' statuses are "out to eat";

exactly n statuses from among N statuses of N contacts are "connected";

blocking/unblocking notifications associated with N contacts.

This type of rule may particularly apply in the context of remote collaborative work requiring the presence of a plurality of contacts.

In one variant, it is possible to pair of rule with the time. By way of example, a rule is to be applied only:

From 12 PM to 2 PM, from Monday 8 PM to Friday 6 PM or from 8 AM to 10 AM, with the option of repeating or not repeating this period (every day, every week, every month, only Monday. Tuesday, and Saturday, only the second week, only the month of September to June (by means of a checklist or other selection method));

for a certain length of time (one hour, two hours, or one day, for example) beginning from when the rule is defined or from a given date (in the time format: minute/day/month/year, for example).

According to another mode of configuring the filtering rules, the user may define his or her own role, thereby making it possible to define more selective and more complex rules. For example, define a rule dealing with.

a particular sequence of a certain contact's statuses ("logged in"—"busy"—"out to eat"—"do not disturb" for example);

a particular combination of statuses: from {"status A" or "status B" or "status C"} to {"status D" or "status E"}, or from {"status A" or "status W"} to {other status than "status A" and "status W"}, for example (from {"busy" or "do not disturb"} to {"available" or "at the office"});

the invariability duration of a contact's status in an interval of time ("out to eat" for 3 hours between 8 AM-12 PM for example);

frequency of a certain notification sequence ("available-away-available twice per day, for example);

a combination of the preceding factors.

A notification is displayed to the observer once a rule is satisfied.

According to another variant, a notification is displayed to the user whenever there is a failure in establishing a communication with the contact. In other terms, whenever a user attempts to interact (requesting to turn on a webcam, to pick up, or to agree to receive data, for example) with a contact when the contact is not available, a notification appears, offering one or more appropriate dictated rules (in accordance with the current status of the contact and the user's request).

By way of example, whenever a user A requests a voice communication with a user B who appears in his or her list of contacts, while that user is already in a phone call and his or her current status is "in a call" (or "on the phone"), a notification:

indicates that the communication failed to be established as a result of the current status of user B (for example, "your call could not be established because user B's current status is "in a call")

makes an offer to user A to get informed once user B's status is no longer the status "in a call", or once user A's status is "available."

In particular, this notification does not appear when user A's request is satisfied, even if user B's status at the time of the request did not necessarily involve the satisfaction of that request. This may, for example, occur when:

- user A has a means of instant communication capable of supporting two interactions at once (a mobile phone capable of receiving two calls at the same time, an instant messaging application capable of establishing voice-based and text-based communication at the same time, for example);
- user B has, accidentally or intentionally, selected a status that seems incompatible with the received request.

Based on another variant illustrated in FIG. 3, a notification may display different actions to be activated by the user A, within the limits of the capacities and current configuration of the means of instant communication available to user A and to the contact. This notification displays the contact's new presence status as well as other actions such as: "call this contact", "change my status" and "send a message to this contact".

A user logged in to an instant messaging application that only allows text-based and voice-based communication does not display a visual communication option with a contact who has just logged in, for example, even if his or her means of instant communication which is compatible with that of user A supports visual communication.

According to another mode for associating actions with a rule, an action is automatically triggered once this rule is met. By way of example, the action of beginning a voice-based communication with a contact who currently has the status "in a call" once he or she has changed his or status, or the action of automatically changing my status to "invisible" once a certain contact's status is "logged in".

Furthermore, the notification generator (who was the originator of a notification reviewed by an observer) may manage the notifications to be transmitted to the presence server 10 and broadcast afterwards to his or her list of contacts or to social networking and microblogging tools.

Referring again to FIG. 2, the user of the means 1 of instant communications, as a generator, may configure personal presence messages, which will be broadcast, based, for example, on:

- the time, such as: selecting the message "XXXX" from date1 to date2, where "XXXX" is a personal message to be selected from a list of predefined personal messages or a new personal message to be defined by the user. Date1 and date2 are two dates to be defined by the user, date1 being prior to date2;
- the state of a communication tool (telephone, webcam for example) supported by the means 1 of instant communications;
- changing from or to a particular presence status (from "on the phone", to "available", for example), from a certain status (from "busy", or from "on the phone");
- a combination of the preceding criteria, such as: if my presence status changes from "non logged in" to "logged in" before 9 AM, broadcast "I just arrived at work."

The presence information (personal message and/or presence status) of a user is broadcast (information push) to social networking and microblogging tools (such as Twitter or Yammer) by means of application programming interfaces (APIs) such as the API offered by Twitter. This is because the means of instant communications automatically forwards the presence information to the social networking and microblogging tools, without these tools needing to search for them, via the corresponding application programming interfaces. This operation is commonly designated "information push." This operation enables an automatic configuration of presence information.

A means of instant communication that supports a certain communication format (voice or visual, for example) and that has the tool appropriate to that format (headset/microphone/telephone, or webcam/camera), can detect the state of that tool (available/busy) and change the user's status accordingly. By way of example, once the user picks up a telephone associated with at least one means of instant communications, the user's status becomes "on the phone". Once the user hangs up the telephone, his or her status becomes "phone call over" or returns to the presence information that preceded that call.

A user may define different profiles for managing presence notifications. A profile comprises at least one configuration rule of received or sent notifications. This profile is saved so that it can be imported/exported from one means 1 of instant communications to another 2-6, as well as from one account to another within a single means 1 of instant communications offering the presence service.

Preferably, the rules for filtering the notifications and/or the configuration of the presence statuses concerning a profile are stored in a file in a format compatible with most of the means 1-6 of instant communications.

In order to simplify the ability to access the functions offered by this multi-criteria management of presence notifications, it is preferable to add a "Notify Me" function to the appropriate menus of this service: by way of example, getting this function from among the functions accessible via right-clicking on a contact, or in a configuration menu.

FIG. 2 schematically depicts an interface displaying examples of features proposed by the present invention. This interface enables the user to configure, customize, and add rules. This interface is equipped with a means of verifying the consistency of the rules configured by the user.

The rules configured by the user act in the following manner:

- the rules concerning the observer of the notifications (located in the left-hand part of the example in FIG. 2) act on the notifications transmitted from the presence server 10. To that end, all of the presence notifications transmitted from the presence server are recorded in a database in order to be filtered afterward in accordance with the rules configured by the user;
- the rules concerning the configuration or broadcasting of presence information (located in the right-hand part of the example in FIG. 2) make it possible to automatically configure the user's status as well as to broadcast his or her presence information over social networking and microblogging tools.

The presence notifications, accompanied by the details relating to them, are, at least for a moment, recorded in a database. The details comprise the date of receipt and the contact.

It should be noted that the invention is not limited to the configuration described by FIG. 2. The implementation of the features proposed by the present invention shall be adapted to the capacities of the means 1 of instant communications (a mobile terminal, a web interface, an instant messaging application).

The management of presence notifications just described exhibits a certain number of advantages. In particular, it makes it possible to:

- automatically modify the user's presence information within social networking and microblogging tools in accordance with the presence information indicated within other means of instant communications;

automatically configure the user's presence information;

enable multi-criteria filtering (time, current status, changes in status, for example) of the notifications to be displayed and transmitted from the presence server 10.

It should be noted that the presence information comprises the presence status and/or a personal message. The personal message may comprise, by way of example, the explanation for an unavailability, the mood of the user, or more generally speaking, a comment.

At this point, it is important to note that the present invention is independent of the programming language used to implement these features.

It should be noted that the expression "means of instant communications" here designates any means of communications enabling an instant remote communication via a communication network, regardless of the form of the communication; text-based, voice-based, visual, or any combination of same.

The invention claimed is:

1. A processor-implemented multi-criteria method for managing presence notifications proposed by instant communications comprising a list of contacts that is not empty and connected to a presence server, which method comprises:
    configuring rules for filtering the presence notifications to be displayed and transmitted from the presence server;
    automatically configuring the presence information;
    automatically broadcasting presence information on social networking and microblogging tools;
    wherein the criteria for automatically configuring the presence statuses comprise the time, the state of a communication tool supported by the instant communications, and the change from or to a particular presence status.

2. A method according to claim 1, wherein the criteria dealt with by the filtering rules comprise:
    the number of repetitions of a certain sequence of a statuses of a contact from the list of contacts for each period of time;
    the invariability duration of the status of a certain contact from the list of contacts;
    the number of presence notifications transmitted from the presence server;
    a particular status of a certain contact from the list of contacts.

3. A method according to claim 1, wherein the presence notifications are saved in a database.

4. A method according to claim 1, wherein the rules for filtering the presence notifications concern one or more contacts.

5. A method according to claim 1, wherein an action is associated with a filtering rule.

6. A multi-criteria system for managing presence notifications proposed by instant communications comprising a list of contacts that is not empty and is connected to a presence server, which system comprises a computer processing unit configured to:
    configure rules to filter the presence notifications to be displayed and transmitted from the presence server;
    automatically configure presence information;
    automatically broadcast the presence information on social networking and microblogging tools;
    wherein the criteria for automatically configuring the presence statuses comprise the time, the state of a communication tool supported by the instant communications, and the change from or to a particular presence status.

7. A system according to claim 6, further comprising a database for saving the presence notifications to be displayed.

8. A system according to claim 6, wherein the automatic broadcasting of presence information on the social networking and microblogging tools is carried out by one or more application programming interfaces adapted to these tools.

9. A computer program product implemented on a memory medium, which may be implemented within a computer processing unit, and comprises instructions to implement a method according to claim 1.

* * * * *